(12) United States Patent
Huang et al.

(10) Patent No.: US 8,922,933 B2
(45) Date of Patent: Dec. 30, 2014

(54) SYSTEMS AND METHODS FOR LOOP PROCESSING WITH VARIANCE ADAPTATION

(71) Applicant: LSI Corporation, San Jose, CA (US)

(72) Inventors: Jianzhong Huang, San Jose, CA (US); Haitao Xia, San Jose, CA (US); Rui Cao, Milpitas, CA (US); Lu Pan, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/742,336

(22) Filed: Jan. 15, 2013

(65) Prior Publication Data

US 2014/0198405 A1 Jul. 17, 2014

(51) Int. Cl.
*G11B 5/035* (2006.01)
*G11B 20/10* (2006.01)
*G11B 5/09* (2006.01)

(52) U.S. Cl.
CPC ..................................... *G11B 5/035* (2013.01)
USPC ............................................. 360/65; 360/39

(58) Field of Classification Search
None
See application file for complete search history.

(56) References Cited

U.S. PATENT DOCUMENTS

| | | | |
|---|---|---|---|
| 6,535,553 B1 | 3/2003 | Limberg et al. | |
| 7,248,630 B2 | 7/2007 | Modrie | |
| 7,257,764 B2 | 8/2007 | Suzuki | |
| 7,421,017 B2 | 9/2008 | Takatsu | |
| 7,502,189 B2 | 3/2009 | Sawaguchi | |
| 7,715,471 B2 | 5/2010 | Werner | |
| 8,046,666 B2 | 10/2011 | Park | |
| 2006/0123285 A1 | 6/2006 | De Araujo | |
| 2009/0002862 A1 | 1/2009 | Park et al. | |
| 2011/0072335 A1 | 3/2011 | Liu et al. | |
| 2011/0075569 A1 | 3/2011 | Marrow | |
| 2011/0167227 A1 | 7/2011 | Yang et al. | |
| 2012/0124118 A1* | 5/2012 | Ivkovic et al. | 708/322 |
| 2013/0106637 A1* | 5/2013 | Liao et al. | 341/155 |

* cited by examiner

*Primary Examiner* — Regina N Holder
(74) *Attorney, Agent, or Firm* — Hamilton DeSanctis & Cha (57) ABSTRACT

Systems and methods for data processing, and more particularly systems and methods for loop processing with variance adaptation.

20 Claims, 3 Drawing Sheets

SYSTEMS AND METHODS FOR LOOP PROCESSING WITH VARIANCE ADAPTATION

FIELD OF THE INVENTION

Various embodiments of the present invention provide systems and methods for data processing, and more particularly to systems and methods for loop processing with variance adaptation.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. When recovering transferred data, loop processing may be performed to detect the values of the transferred data and to perform functions such as gain control and noise filtering. Such loop processing often includes filtering with noise predictive finite impulse response filters, which improves the bit error rate performance of the loop processing path, although it increases the channel length, system complexity and decision latency.

SUMMARY

Various embodiments of the present invention provide systems and methods for data processing, and more particularly to systems and methods for loop processing with variance adaptation.

A data processing system is disclosed including a filter circuit, a variance adaptation circuit and a data detector circuit. The filter circuit is operable to equalize a series of digital samples. The variance adaptation circuit is operable to generate a scaling factors for the series of digital samples. The data detector circuit is operable to scale the series of digital samples by the plurality of scaling factors to yield scaled digital samples and to apply a data detection algorithm to the scaled digital samples to yield a detected output. The variance of the distribution for each data pattern in the series of digital samples is normalized by the scaling factors.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Various embodiments of the systems and methods disclosed herein for loop processing provide scaling factors for the input to a data detector so that different input data patterns have substantially the same variance. This increases the bit error rate (BER) or symbol error rate in a read channel loop path, while allowing the loop processing to be performed without noise predictive finite impulse response (NPFIR) filters that would otherwise increase the channel length, system complexity and decision latency. The shorter decision latency enables the loop processing to quickly react to extreme noise conditions with large phase/frequency errors, without sacrificing the bit error rate of the loop path. This also enables the loop path length to be matched to the data path length.

Loop processing with variance adaptation disclosed herein is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 1:
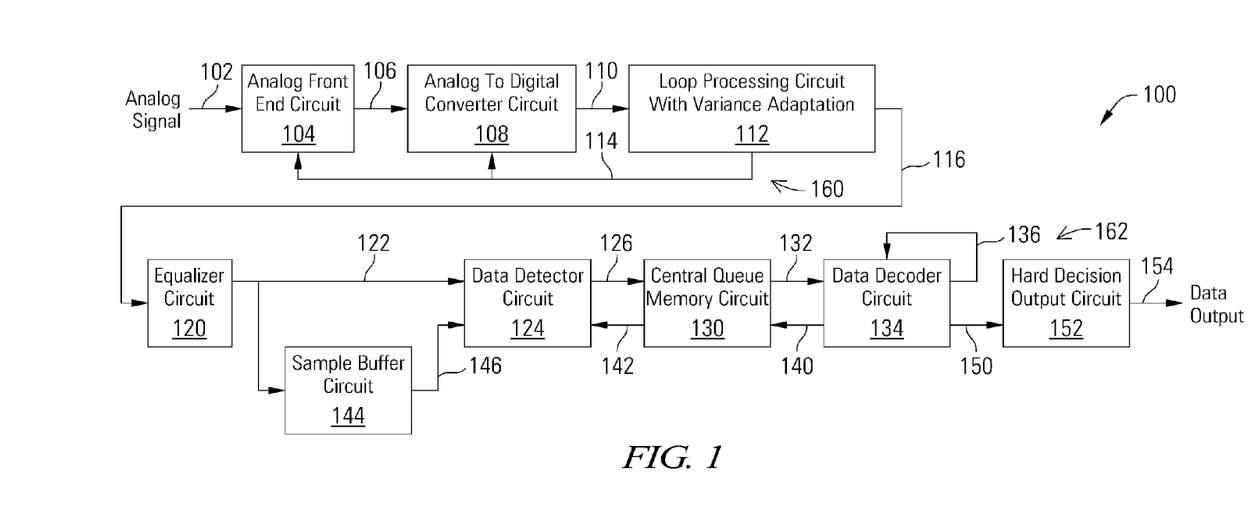
FIG. 1 depicts a read channel circuit with a loop processing path with variance adaptation and a data processing path in accordance with various embodiments of the present invention.

Turning to FIG. 1, a read channel circuit 100 is depicted with a loop processing path 160 with variance adaptation and a data processing path 162 in accordance with various embodiments of the present invention. The loop processing path 160 performs functions such as, but not limited to, determining timing feedback and other operations designed to align the sampling of analog to digital converter circuit 108 with the received data set, and/or to adjust a gain applied by analog front end circuit 104, while the data processing path 162 detects the correct values in the received data set. Read channel circuit 100 includes an analog front end circuit 104 that receives an analog signal 102. Analog front end circuit 104 processes analog signal 102 and provides a processed analog signal 106 to an analog to digital converter circuit 108. Analog front end circuit 104 may include, but is not limited to, an analog filter and an amplifier circuit as are known in the art. Based upon the disclosure provided herein, one of ordinary skill in the art will recognize a variety of circuitry that may be included as part of analog front end circuit 104. In some cases, analog input signal 102 is derived from a read/write head assembly (not shown) that is disposed in relation to a storage medium (not shown). In other cases, analog signal 102 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog signal 102 may be derived.

Analog to digital converter circuit 108 converts processed analog signal 106 into a corresponding series of digital samples 110. Digital samples 110 (and signals derived therefrom) prior to being processed by an equalizer circuit (e.g., 120) are considered X samples. Analog to digital converter circuit 108 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 110 are provided to a loop processing circuit with variance adaptation 112, which is operable to equalize digital samples 110, detect values in digital samples 110, and generate feedback 114 such as, but not limited to, timing feedback and other information designed to align the sampling of analog to digital converter circuit 108 with the received data set, and/or to adjust the gain applied by analog front end circuit 104. In some embodiments, loop processing circuit with variance adaptation 112 is also operable to remove DC noise from digital samples 110, yielding processed digital samples 116. Loop processing circuit 112 includes circuits for variance adaptation, and in various embodiments also includes one or more circuits such as, but not limited to, equalization filter circuits and data detection circuits operable to detect the values of digital samples 110, loop pulse estimation circuits and convolution filter circuits operable to determine the DC noise in digital samples 110, and filter circuits operable to measure the gain and phase of the digital samples 110. Based upon the disclosure provided herein, one of ordinary skill in the art will recognize a variety of loop processing circuits that may be included in loop processing circuit 112 in various embodiments of the present invention.

Processed digital samples 116 are provided to an equalizer circuit 120 in the data processing path 162. Equalizer circuit 120 applies an equalization algorithm to processed digital samples 116 to yield an equalized output 122. In some embodiments of the present invention, equalizer circuit 120 is a digital finite impulse response filter circuit as are known in the art. Equalized output 122 is stored to a sample buffer circuit 144 that includes sufficient memory to maintain one or more codewords until processing of that codeword is completed through a data detector circuit 124 and a data decoder circuit 134 including, where warranted, multiple "global iterations" defined as passes through both data detector circuit 124 and data decoder circuit 134 and/or "local iterations" defined as passes through data decoding circuit 134 during a given global iteration. Sample buffer circuit 144 stores the received data as buffered data 146.

Data detector circuit 124 is a data detector circuit capable of producing a detected output 126 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 124 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 126 is provided to a central queue memory circuit 130 that operates to buffer data passed between data detector circuit 124 and data decoder circuit 134. When data decoder circuit 134 is available, data decoder circuit 134 receives detected output 126 from central queue memory 130 as a decoder input 132. Data decoder circuit 134 applies a data decoding algorithm to decoder input 132 in an attempt to recover originally written data. The result of the data decoding algorithm is provided as a decoded output 140. Similar to detected output 126, decoded output 140 may include both hard decisions and soft decisions. Data decoder circuit 134 may be any data decoder circuit known in the art that is capable of applying a decoding algorithm to a received input. Data decoder circuit 134 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 134 provides the result of the data decoding algorithm as a data output 150. Data output 150 is provided to a hard decision output circuit 152 where the data is reordered before providing a series of ordered data sets as a data output 154.

One or more iterations through the combination of data detector circuit 124 and data decoder circuit 134 may be made in an effort to converge on the originally written data set. As mentioned above, processing through both the data detector circuit and the data decoder circuit is referred to as a "global iteration". For the first global iteration, data detector circuit 124 applies the data detection algorithm without guidance from a decoded output. For subsequent global iterations, data detector circuit 124 applies the data detection algorithm to buffered data 146 as guided by decoded output 140. Decoded output 140 is received from central queue memory 130 as a detector input 142.

During each global iteration it is possible for data decoder circuit 134 to make one or more local iterations including application of the data decoding algorithm to decoder input 132. For the first local iteration, data decoder circuit 134 applies the data decoding algorithm without guidance from a decoded output 136. For subsequent local iterations, data decoder circuit 134 applies the data decoding algorithm to decoder input 132 as guided by a previous decoded output 136. In some embodiments of the present invention, a default of ten local iterations is allowed for each global iteration.

The loop processing path 160 adjusts the operation of circuits such as analog front end circuit 104 and analog to digital converter circuit 108, adjusting gain, sampling phase, and other characteristics, which enable the data processing path 162 to more efficiently produce correct values at data output 154. Notably, the loop processing circuit with variance adaptation 112 may be used in other applications than in read channel circuit 100 supporting data processing path 162 as in FIG. 1.

Figure 2:
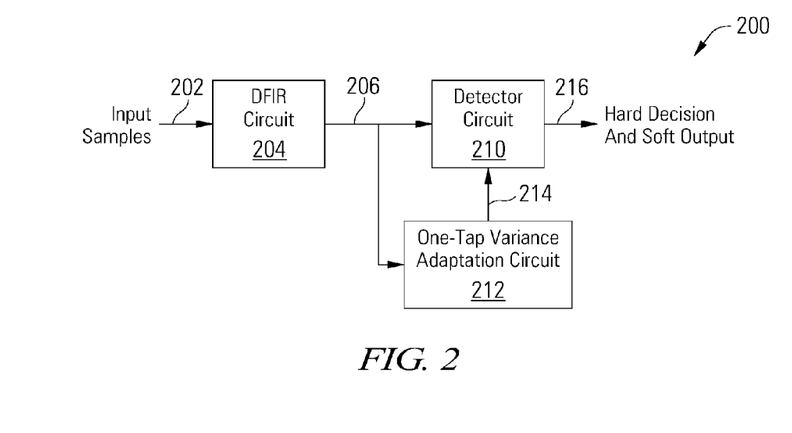
FIG. 2 depicts a loop processing circuit with variance adaptation in accordance with various embodiments of the present invention.

Turning to FIG. 2, a loop processing circuit 200 with variance adaptation is depicted in accordance with various embodiments of the present invention. A digital finite impulse response filter circuit 204 receives digital input samples 202, or X samples, and applies an equalization algorithm to input samples 202 to yield an equalized output 206, or Y samples. Input samples 202 may be provided, for example, from an analog to digital converter circuit (e.g. 108) or other source of digital samples or digital data.

A data detector circuit 210 detects the values of bits or symbols in the equalized output 206. Data detector circuit 210 is a data detector circuit capable of producing a detected output 216 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 210 may provide both hard decisions and soft decisions as detected output 216. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

A variance adaptation circuit 212 generates a scaling factor 214 for data detector circuit 210, based on a data pattern in the Y samples, on an ideal data pattern, and on a target variance, such that the variance of all data patterns in the input samples 202 is substantially the same. The variance adaptation circuit 212 generates a different scaling factor for each data pattern in equalized output 206 in order to normalize the variance of the different data patterns. The Y samples in equalized output 206 are multiplied by the scaling factor corresponding to the data pattern in the Y samples, either in the data detector circuit 210 or in a multiplier (not shown) between the digital finite impulse response filter circuit 204 and the data detector circuit 210. In effect, because the Y samples in equalized output 206 are multiplied by the scaling factor 214, the loop processing circuit 200 can be considered to contain a one-tap noise predictive finite impulse response filter with the scaling factor 214 as the tap coefficient, which is used to normalize the variance.

Figure 4:
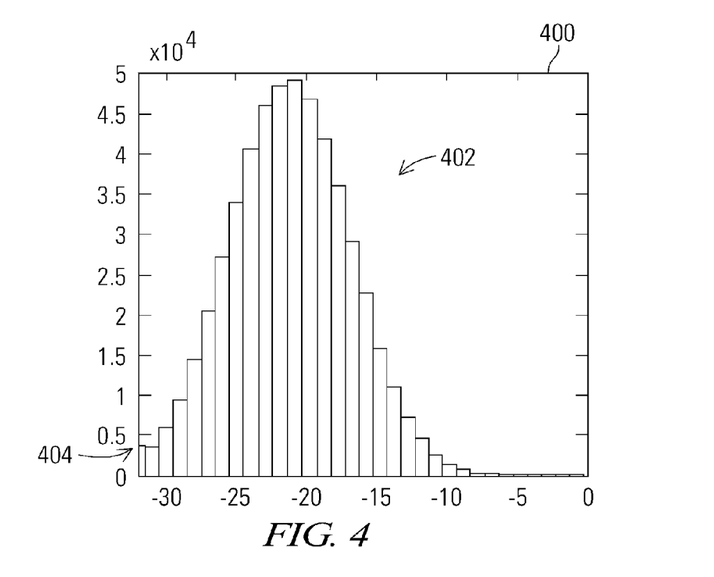
FIG. 4 is a plot showing a distribution of Y sample values corresponding to an input data pattern of 000 in accordance with some embodiments of the present invention.

In some embodiments in which Y samples are three bits symbols with eight possible values from 000 to 111, a scaling factor is calculated for each of the eight possible values, normalizing the variance of the distribution of detected values for each of the eight possible values. Each set of scaling factors contains eight scaling factors in these embodiments, one per possible symbol value. For all of the detected values in a data sector for each of those symbol values, there will be a Gaussian distribution of the detected values. For example, the Gaussian distribution of the detected values for an actual value of 000 is shown in FIG. 4.

The set of scaling factors 214 thus includes eight scaling factors in these embodiments, one per possible symbol value, and eight parallel multipliers in data detector circuit 210 (or in external multipliers, not shown) are used to multiply eight Y sample values in equalized output 206 by the eight scaling factors 214 or tap coefficients for each of eight possible data patterns (000-111). This is equivalent, in effect, to eight one-tap noise predictive finite impulse response filters that normalize the variance in the detected value Gaussian distribution for each of the eight possible values of the Y samples in equalized output 206, and the variance-normalized Y samples are used for channel detection in data detector circuit 210. By normalizing the variances, the Gaussian distributions for each of the eight possible values of the Y samples in equalized output 206 will have roughly the same width or shape, increasing the bit error rate of the data channel.

The scaling factors 214 multiplied by the error in the Y samples yields the normalized variance according to Equation 1:

$$a_i(y_i - yideal_i) \sim N(0, \sigma_{target}^2) \qquad (Eq\ 1)$$

where $a_i$ is the scaling factor for applied for Y sample value i or data pattern i, $y_i$ is the Y sample for value i of the i (e.g., 8) possible symbol values, $yideal_i$ is the ideal Y sample for value i, and $\sigma_{target}^2$ is the target variance.

The updating equation to find the scaling factor $a_i$ in variance adaptation circuit 212 is:

$$a_i^{new} = a_i^{old} - \mu\left(\left|a_i^{old}(y_i - yideal_i) - \sqrt{\frac{2\sigma_{target}^2}{\pi}}\right|\right) \qquad (Eq\ 2)$$

where $\mu$ adjusts the rate at which the scaling factor is updated. The variance adaptation circuit 212 may be any circuit operable to implement Equation 2, such as multipliers and adders, or a lookup table. Based upon the disclosure provided herein, one of ordinary skill in the art will recognize a variety of circuits or executable code that may be used to implement the variance adaptation circuit 212 in relation to different embodiments of the present invention.

Again, the Gaussian distribution of the detected values for an actual value of 000 is shown in plot 400 of FIG. 4. In some embodiments, based on how the analog to digital converter (e.g., 108) operates, the Gaussian distribution 402 of detected values for pattern 000 may be truncated at the left edge 404 or lower boundary of analog to digital converter outputs, such as at −32 in an analog to digital converter with an output range of −32 to 31. Similarly, the Gaussian distribution of detected values for pattern 111 may be truncated at the right edge or upper boundary of analog to digital converter outputs, such as at 31 in an analog to digital converter with an output range of −32 to 31. In other words, for the DC patterns, i.e., 000 or 111, the distribution is a truncated "Gaussian-like" shape. To calculate the variance for the DC patterns exactly, the edge effect should be taken into consideration. Assuming the Y sample distribution is symmetric around the $yideal_i$ value, the variance calculation for DC patterns 000 and 111 is calculated using only half the distributions. For pattern 000, given that the distribution is truncated at the left edge 404 as shown in FIG. 4, the variance is calculated based on the right half of the distribution curve, where $y_0 > yideal_0$, where $yideal_0$ is the ideal Y sample value in equalized output 206 for pattern 000, or about −21 in the embodiment of FIG. 4. The updating equation to find the scaling factor $a_0$ in variance adaptation circuit 212 is:

$$a_0^{new} = a_0^{old} - \mu \left( \left| a_0^{old}(y_0 - yideal_0) - \sqrt{\frac{2\sigma_{target}^2}{\pi}} \right| \right), \quad \text{(Eq 3)}$$

$$y_0 > yideal_0$$

For pattern 111, given that the distribution is truncated at the right edge, the variance is calculated based on the left half of the distribution curve, where $y_7 < yideal_7$, where $yideal_7$ is the ideal Y sample value in equalized output 206 for pattern 111. The updating equation to find the scaling factor $a_7$ in variance adaptation circuit 212 is:

$$a_7^{new} = a_7^{old} - \mu \left( \left| a_7^{old}(y_7 - yideal_7) - \sqrt{\frac{2\sigma_{target}^2}{\pi}} \right| \right), \quad \text{(Eq 4)}$$

$$y_7 < yideal_7$$

The variance adaptation circuit 212 is operated in some embodiments during a training mode using a known non-return to zero (NRZ) data pattern. The output of a data decoder circuit (e.g., 134) such as a low density parity check decoder to provide the ideal values of the Y samples, used to generate the scaling factors 214. If data converges in the data decoder circuit (e.g., 134), there is a high confidence that the hard decision outputs are the correct or ideal values for the Y samples in equalized output 206. In other embodiments, the variance adaptation circuit 212 is operated periodically or continuously during normal operation, generating or updating the scaling factors 214 based on the output of a data decoder circuit (e.g., 134).

The data output 216 from data detector circuit 210 may be used in a variety of ways, including but not limited to calculating timing feedback and other information designed to align the sampling of an analog to digital converter circuit with the received data set, adjusting the gain applied by an analog front end circuit, calculating and remove direct current (DC) noise from digital samples, etc.

Figure 3:
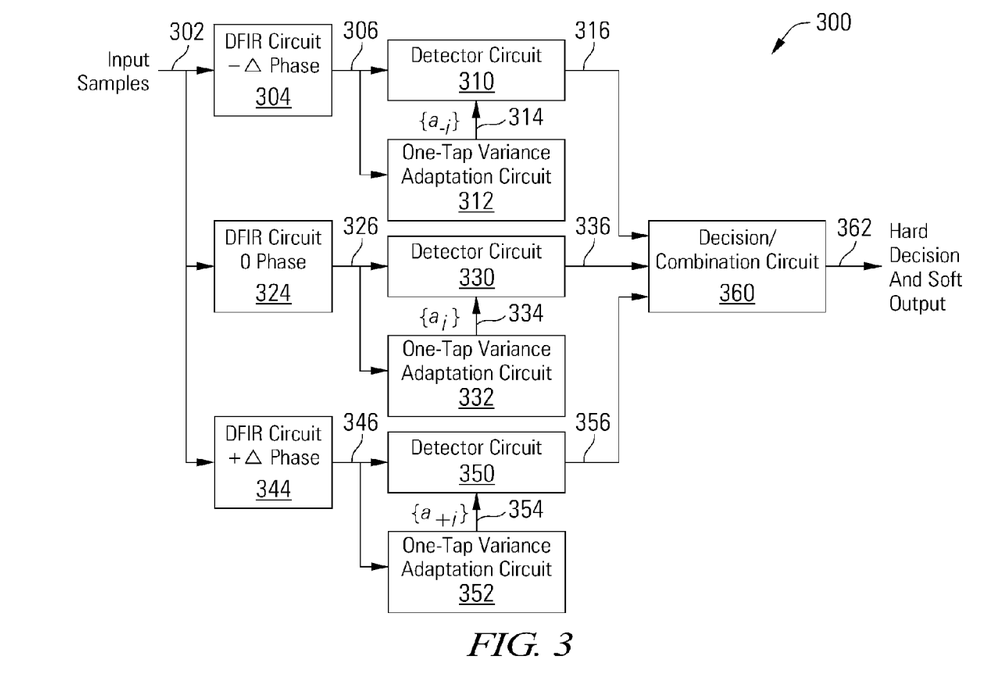
FIG. 3 depicts a multiphase loop processing circuit with variance adaptation in accordance with various embodiments of the present invention.

Turning to FIG. 3, a multi-phase loop processing circuit 300 with variance adaptation is depicted in accordance with various embodiments of the present invention. In this embodiment, multiple phases of input samples 302 are processed in parallel. In some embodiments of a multi-phase loop processing circuit 300, the different phases of input samples 302 are generated by an analog to digital converter (not shown) that samples the input at different phases to provide multiple outputs of different phases. In other embodiments, multiple analog to digital converters (not shown) are used, each sampling the input at different phases. In yet other embodiments, one or more interpolators (not shown) are used to process the Y samples from an analog to digital converter to provide multiple outputs at different sampling phases.

A digital finite impulse response filter circuit 304, 324, 344 is provided for each different phase input stream. In this embodiment, digital finite impulse response filter circuit 324 receives a default phase version of input samples 302, digital finite impulse response filter circuit 304 receives an advanced phase version of input samples 302, and digital finite impulse response filter circuit 344 receives a delayed phase version of input samples 302. The digital finite impulse response filter circuits 304, 324, 344 apply an equalization algorithm to their respective phases of input samples 302 to yield equalized outputs 306, 326, 346 respectively, or Y samples.

Data detector circuits 310, 330, 350 detect the values of bits or symbols in the equalized outputs 306, 326, 346. Variance adaptation circuits 312, 332, 352 generate scaling factors 314, 334, 354 for data detector circuits 310, 330, 350, based on data patterns in the Y samples, on ideal data patterns for each of the different sampling phases, and on a target variance, such that the variances of all data patterns in equalized output 306 are substantially the same, and in equalized output 326 are substantially the same, and in equalized output 346 are substantially the same (although variances across sampling phases are not normalized in some embodiments). The Y samples in equalized outputs 306, 326, 346 are multiplied by the scaling factors 314, 334, 354 either in the data detector circuit 210 or in a multiplier (not shown) between the digital finite impulse response filter circuit 204 and the data detector circuit 210. In effect, because the Y samples in equalized outputs 306, 326, 346 are multiplied by the scaling factors 314, 334, 354, the loop processing circuit 300 can be considered to contain one-tap noise predictive finite impulse response filters with the scaling factors 314, 334, 354 as the tap coefficients, which are used to normalize the variances. Detected outputs 316, 336, 356 will have been generated for three (or another number) of sampling-phases of input samples 302. The Y samples that were sampled at the closest phase to the actual phase of the data will have the lowest error, or $y_i - yideal_i$. A decision/combination circuit 360 selects the detector output 316, 336, 356 with the lowest error or $y_i - yideal_i$. The decision/combination circuit 360 yields the selected detector output 316, 336, 356 at data output 362.

In some embodiments, the variance adaptation circuit(s) 212, 312, 332, 352 can be turned off to save power when the adaptation process is complete. In some embodiments, to reduce circuit size, a single variance adaptation circuit 312 is used to train the data-dependent variance for multiple equalized output paths of different sampling phases.

The data output 362 may be used in a variety of ways, including but not limited to calculating timing feedback and other information designed to align the sampling of an analog to digital converter circuit with the received data set, adjusting the gain applied by an analog front end circuit, calculating and remove direct current (DC) noise from digital samples, etc.

In some embodiments, the yideal values are programmable and can be calculated with the default Y ideal values calculated from the digital finite impulse response filter circuit target and the variance scale adaptively.

Figure 5:
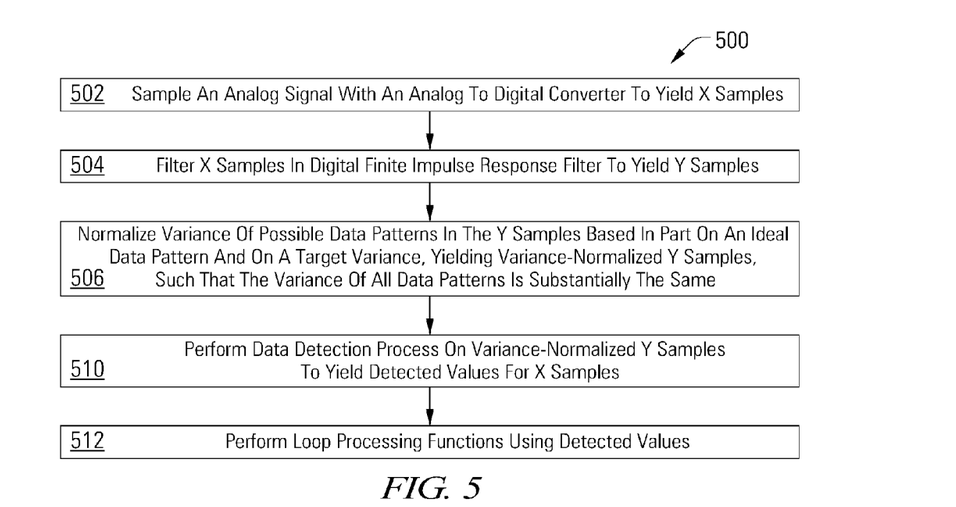
FIG. 5 is a flow diagram showing a method for loop processing with variance adaptation in accordance with some embodiments of the present invention.

Turning to FIG. 5, flow diagram 500 shows a method for loop processing with variance adaptation in accordance with some embodiments of the present invention. Following flow diagram 500, an analog signal is sampled with an analog to digital converter to yield X samples (block 502). The X samples are filtered in a digital finite impulse response filter to yield Y samples (block 504). Normalize variance of possible data patterns in the Y samples based in part on an ideal data pattern and on a target variance, yielding variance-normalized Y samples, such that the variance of all data patterns is substantially the same (block 506). A data detection process is performed on variance-normalized Y samples to yield detected values for X samples (block 510). Loop processing functions are performed using the detected values (block 512).

Figure 6:
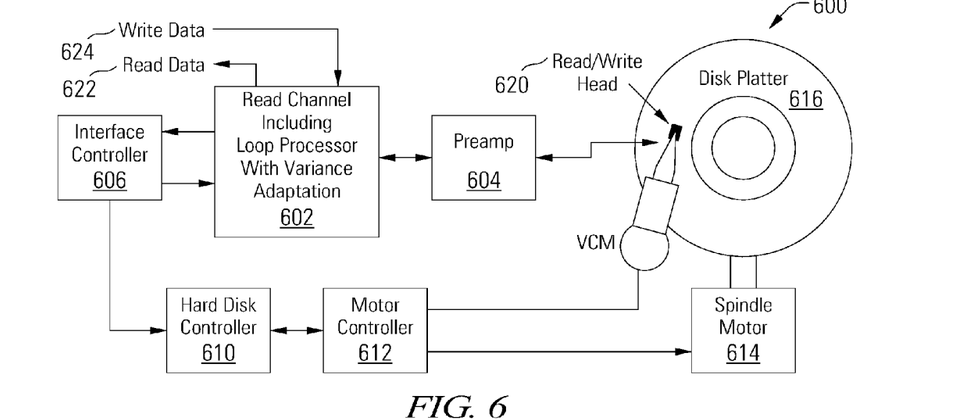
FIG. 6 depicts a storage system including a loop processor with variance adaptation in accordance with various embodiments of the present invention.
Figure 7:
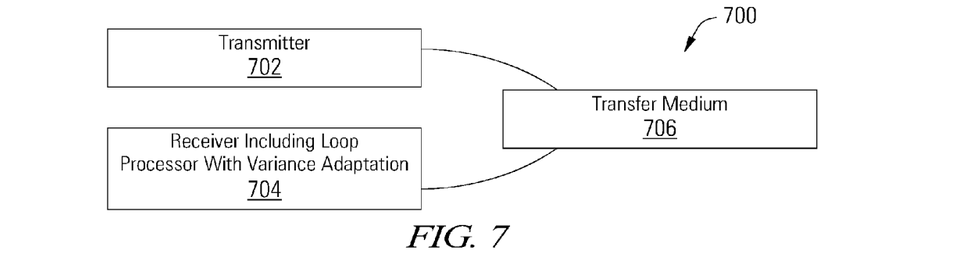
FIG. 7 depicts a wireless communication system including a loop processor with variance adaptation in accordance with various embodiments of the present invention.

Although the loop processing with variance adaptation disclosed herein is not limited to any particular application, several examples of applications are presented in FIGS. 6 and 7 that benefit from embodiments of the present invention. Turning to FIG. 6, a storage system 600 is illustrated as an example application of a loop processor with variance adaptation in accordance with some embodiments of the present invention. The storage system 600 includes a read channel circuit 602 with a loop processor with variance adaptation in accordance with some embodiments of the present inventions. Storage system 600 may be, for example, a hard disk drive. Storage system 600 also includes a preamplifier 604, an interface controller 606, a hard disk controller 610, a motor controller 612, a spindle motor 614, a disk platter 616, and a read/write head assembly 620. Interface controller 606 controls addressing and timing of data to/from disk platter 616. The data on disk platter 616 consists of groups of magnetic signals that may be detected by read/write head assembly 620 when the assembly is properly positioned over disk platter 616. In one embodiment, disk platter 616 includes magnetic signals recorded in accordance with either a longitudinal or a perpendicular recording scheme.

In a typical read operation, read/write head assembly 620 is accurately positioned by motor controller 612 over a desired data track on disk platter 616. Motor controller 612 both positions read/write head assembly 620 in relation to disk platter 616 and drives spindle motor 614 by moving read/write head assembly 620 to the proper data track on disk platter 616 under the direction of hard disk controller 610. Spindle motor 614 spins disk platter 616 at a determined spin rate (RPMs). Once read/write head assembly 620 is positioned adjacent the proper data track, magnetic signals representing data on disk platter 616 are sensed by read/write head assembly 620 as disk platter 616 is rotated by spindle motor 614. The sensed magnetic signals are provided as a continuous, minute analog signal representative of the magnetic data on disk platter 616. This minute analog signal is transferred from read/write head assembly 620 to read channel circuit 602 via preamplifier 604. Preamplifier 604 is operable to amplify the minute analog signals accessed from disk platter 616. In turn, read channel circuit 602 decodes and digitizes the received analog signal to recreate the information originally written to disk platter 616. This data is provided as read data 622 to a receiving circuit. While processing the read data, read channel circuit 602 processes the received signal using a loop processor with variance adaptation. Such a loop processor with variance adaptation may be implemented consistent with that disclosed in relation to FIGS. 1-4. In some cases, the loop processing may be performed consistent with the flow diagram disclosed in relation to FIG. 5. A write operation is substantially the opposite of the preceding read operation with write data 624 being provided to read channel circuit 602. This data is then encoded and written to disk platter 616.

It should be noted that storage system 600 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 600, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 600 may be modified to include solid state memory that is used to store data in addition to the storage offered by disk platter 616. This solid state memory may be used in parallel to disk platter 616 to provide additional storage. In such a case, the solid state memory receives and provides information directly to read channel circuit 602. Alternatively, the solid state memory may be used as a cache where it offers faster access time than that offered by disk platted 616. In such a case, the solid state memory may be disposed between interface controller 606 and read channel circuit 602 where it operates as a pass through to disk platter 616 when requested data is not available in the solid state memory or when the solid state memory does not have sufficient storage to hold a newly written data set. Based upon the disclosure provided herein, one of ordinary skill in the art will recognize a variety of storage systems including both disk platter 616 and a solid state memory.

Turning to FIG. 7, a wireless communication system 700 or data transmission device including a receiver 704 with a loop processor with variance adaptation is shown in accordance with some embodiments of the present inventions. Communication system 700 includes a transmitter 702 that is operable to transmit encoded information via a transfer medium 706 as is known in the art. The encoded data is received from transfer medium 706 by receiver 704. Receiver 704 incorporates a loop processor with variance adaptation. Such a loop processor with variance adaptation may be implemented consistent with that disclosed in relation to FIGS. 1-4. In some cases, the loop processing may be performed consistent with the flow diagram disclosed in relation to FIG. 5.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems and methods for loop processing with variance adaptation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   a filter circuit operable to equalize a series of digital samples;
   a variance adaptation circuit operable to generate a plurality of scaling factors for the series of digital samples based at least in part on the series of digital samples, on ideal values of the series of digital samples, and on a target variance;
   a data detector circuit operable to scale the series of digital samples by the plurality of scaling factors to yield scaled digital samples and to apply a data detection algorithm to the scaled digital samples to yield a detected output, wherein a variance of a distribution for each data pattern in the series of digital samples is normalized by the plurality of scaling factors;
   a second data detector circuit operable to apply to data detection algorithm to a signal derived from the series of digital samples to yield a second detected output; and
   a data decoder circuit operable to apply a data decoding algorithm to a decoder input derived from the second detected output to yield a decoder output, wherein the ideal values are derived from the decoder output.

2. The data processing system of claim 1, wherein the plurality of scaling factors comprises one scaling factor for each of the data patterns in the series of digital samples.

3. The data processing system of claim 1, wherein the ideal values are programmable.

4. The data processing system of claim 1, wherein the variance adaptation circuit is operable to generate the scaling factor for a lowest and a highest one of the data patterns based on only a portion of the digital samples falling to one side of a corresponding ideal value in the distributions for the lowest and the highest one of the data patterns.

5. The data processing system of claim 1, wherein the filter circuit comprises a digital finite impulse response filter circuit.

6. The data processing system of claim 1, wherein the series of digital samples comprises a plurality of data streams having different sampling phases, and wherein the data detector circuit comprises a plurality of data detector circuits each operable to scale one of the plurality of data streams and to apply a data detection algorithm to a scaled one of the plurality of data streams.

7. The data processing system of claim 6, wherein the variance adaptation circuit comprises a plurality of variance adaptation circuits, one for each of the plurality of data detector circuits.

8. The data processing system of claim 6, wherein the variance adaptation circuit is shared by the plurality of data detector circuits to generate a separate plurality of scaling factors for each of the plurality of data streams.

9. The data processing system of claim 6, further comprising a decision circuit operable to select an output of one of the plurality of data detector circuits having a lowest error.

10. The data processing system of claim 1, wherein the variance adaptation circuit is operable to be turned off after a variance adaptation process.

11. The data processing system of claim 1, wherein the system is implemented as an integrated circuit.

12. The data processing system of claim 1, wherein the data processing system is implemented as part of a device selected from a group consisting of: a data storage device, and a data communication device.

13. A method for data processing, comprising:
   sampling an analog signal with an analog to digital converter to yield a series of digital samples;
   filtering the digital samples to yield equalized digital samples;
   normalizing a variance of each data pattern in the equalized digital samples based in part on ideal values of the series of digital samples to yield normalized digital samples; and
   performing a data detection process on the normalized digital samples to yield detected values, wherein normalizing the variance of each data pattern comprises calculating a scaling factor for each data pattern and multiplying the equalized digital samples by the scaling factors, wherein the scaling factors are calculated based at least in part on the series of digital samples, on the ideal values of the series of digital samples, and on a target variance, and wherein the ideal values are derived using a data decoding process operable to identify correct values in the series of digital samples.

14. The method of claim 13, further comprising:
   sampling the analog signal at a different sampling phase to yield a second series of digital samples;
   filtering the second series of digital samples to yield second equalized digital samples;
   normalizing a variance of each data pattern in the second equalized digital samples to yield second normalized digital samples;
   performing a data detection process on the second normalized digital samples to yield second detected values; and
   selecting as output whichever of the detected values and the second detected values has fewer errors.

15. A storage device, comprising:
   a storage medium;
   a head assembly disposed in relation to the storage medium and operable to provide a sensed signal corresponding to a data set on the storage medium; and
   a read channel circuit including:
   an analog to digital converter circuit operable to convert the sensed signal into a series of digital samples;
   a filter circuit operable to equalize the series of digital samples;
   a variance adaptation circuit operable to generate a plurality of scaling factors for the series of digital samples based at least in part on the series of digital samples, on ideal values of the series of digital samples, and on a target variance;
   a data detector circuit operable to scale the series of digital samples by the plurality of scaling factors to yield scaled digital samples and to apply a data detection algorithm to the scaled digital samples to yield a detected output, wherein a variance of a distribution for each data pattern in the series of digital samples is normalized by the plurality of scaling factors;
   a second data detector circuit operable to apply a data detection algorithm to a signal derived from the series of digital samples to yield a second detected output; and
   a data decoder circuit operable to apply a data decoding algorithm to a decoder input derived from the second detected output to yield a decoder output, wherein the ideal values are derived from the decoder output.

16. The method of claim 13, wherein the scaling factor is calculated for a lowest and a highest one of the data patterns based on only a portion of the digital samples falling to one side of a corresponding ideal value in distribution for a lowest and a highest one of the data patterns.

17. The storage device of claim 15, wherein the series of digital samples comprises a plurality of data streams having different samples phases and wherein the data detector circuit comprises a plurality of data detector circuits each operable to scale one of the plurality of data streams and to apply a data detection algorithm to a scaled one of the plurality of data streams.

18. The storage device of claim 17, wherein the variance adaptation circuit comprises a plurality of variance adaptation circuits, one for each of the plurality of data detector circuits.

19. The storage device of claim 17, wherein the variance adaptation circuit is shared by the plurality of data detector circuits to generate a separate plurality of scaling factors for each of the plurality of data streams.

20. The storage device of claim 17, further comprising a decision circuit operable to select an output of one of the plurality of data detector circuits having a lowest error.

* * * * *